W. M. SMITH.
Car Truck.

Patented July 6, 1869.

Witnesses:
C. B. Wilson
Edward Masson

Inventor:
William M. Smith.
By atty A. B. Stoughton.

W. M. SMITH.
Car Truck.

No. 92,219.   Patented July 6, 1869.

Witnesses:

Inventor:
William M. Smith
By atty A. B. Stoughton.

UNITED STATES PATENT OFFICE.

WILLIAM M. SMITH, OF AUGUSTA, GEORGIA.

Letters Patent No. 92,219, dated July 6, 1869.

IMPROVED RAILWAY-CAR TRUCK.

The Schedule referred to in these Letters Patent and making part of the same.

*To all whom it may concern:*

Be it known that I, WILLIAM M. SMITH, of Augusta, in the county of Richmond, and State of Georgia, have invented certain new and useful Improvements in Cars, adapted to run on wide or narrow-gauge railroads; and that the following is a full, clear, and exact description of the same, reference being had to the accompanying drawings, making a part of this specification, in which—

Similar letters of reference, where they occur in the separate figures, denote like parts in all of the drawings.

The "gauge," (as it is commonly called,) in most general use on railroads, that is, the distance in the clear between the two rails constituting a track, is four feet eight and a half inches on many roads, and five feet on many others, whilst on a few roads it reaches as high as six feet. But whilst there is no economy in making cars capable of running on the narrowest and widest of these gauges both, yet it can be done, if found desirable.

But it is very important that cars should be able to run equally well on the two almost universal gauges first mentioned, viz, four feet eight and a half inches and five-feet gauges, as they are connecting and intersecting with each other in all directions, and breaking bulk or shifting freight is an expensive business.

Cars have been made with the tread of the wheels broad enough to run on either of the common gauges without changing them. Others have been made in which the wheels have been shifted, to conform to one gauge or the other.

The broad-tread-wheel arrangement is preferred, because there is nothing to change or arrange, but it is very expensive, and adds much dead weight to the car, which has to be transported at the same expense that freight is transported, and with greater cost for repairs, because of the increased weight.

Both plans have their advantages and disadvantages. I have selected as the best, the mode of shifting the wheels, so as to make them conform to the gauge of the road; but I shift the wheels on one side of the car or truck only, and not both sides, and, at the same time, I so arrange as that the weight shall be central between the wheels, whether on a wide or a narrow gauge. This is the main element in my construction of a car, but, as incidental to this or any other car, I have made certain improvements in bearings, supports, lubrication, &c., which will be hereafter explained.

To enable others skilled in the art to make and use my invention, I will proceed to describe the same with reference to the drawings.

A A represent the end-pieces, and B B and C C, the side-pieces of any ordinary truck-frame, and which is supported and carried on two pairs of wheels D.

E may represent a portion of the car-body, resting upon the truck-frame, the other portion or end of it resting upon a similar truck, in the usual way.

Figure 1:
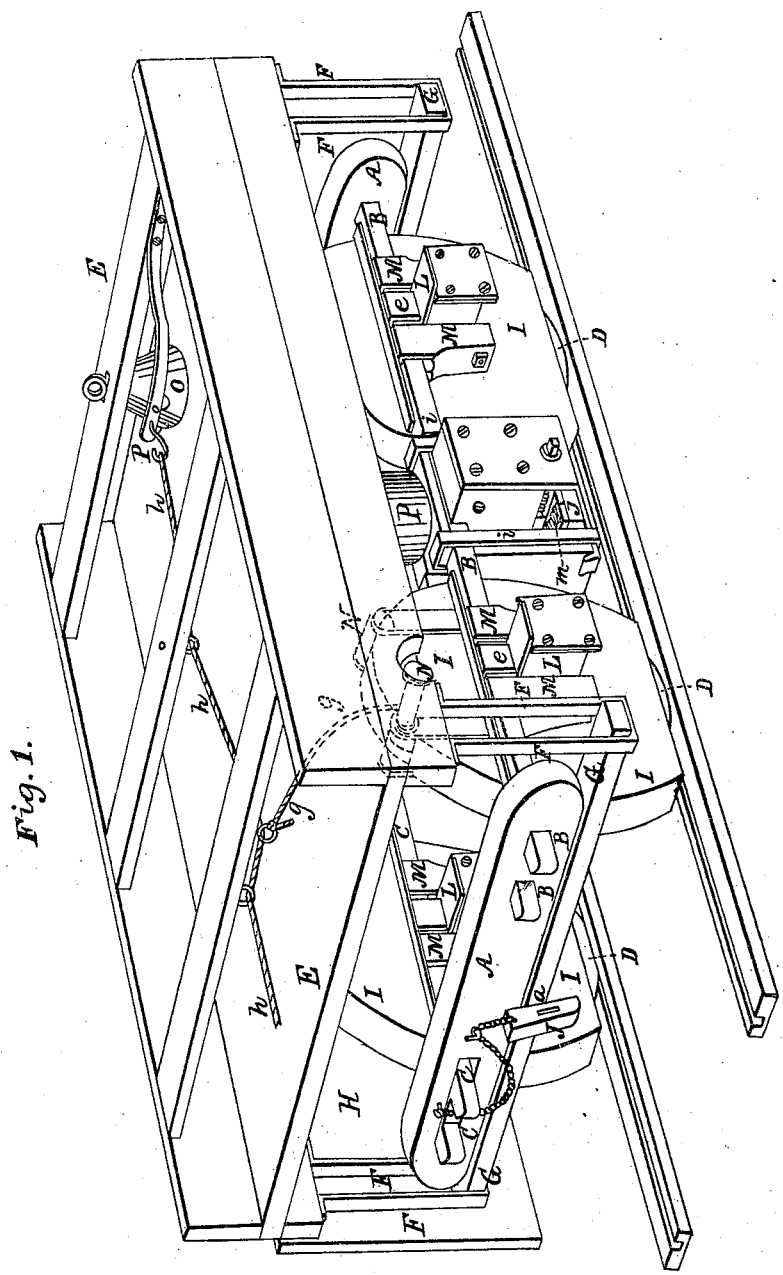
Figure 1 represents, in perspective, a truck or car to which my improvements have been applied.

To this body E there is suspended, as at F F, a timber, or cross-piece, G, which comes directly under the end-pieces A A of the truck-frame, and which are to serve to hold up the truck-frame in case of the breaking of a wheel or axle, and until an alarm is given, or the breaking detected. There are also hung to the sides of the body, guards H H, and the wheels D, I propose to encase, as seen in fig. 1, at I, to prevent, not only accidents, but to prevent dust, &c.

The longitudinal pieces B B of the truck-frame are rigidly framed in and secured to the end-pieces A A; not so, however, the other longitudinal pieces C C, as they project into a long mortise in said end-pieces, in which they can be shifted, and then held by suitable keys or wedges J, which have a hole, *a*, through them, for a safety-key to pass through, to prevent them from getting loose or backing out.

The wheels D D are not arranged in pairs upon one single axle, but each wheel has its own separate short axle K, with journals resting and turning in boxes, supported on the longitudinal pieces B B and C C, between which pieces the wheels are placed and run. To these short axles, or to their journals are connected oil-boxes, or other lubricator-holding vessels L L, and in these boxes, in the ends of the journals, are eccentrically hung hooked rods *c*, which hook into a carrier, *b*, upon which saturated waste may be placed, or which may dip down into the oil, or other liquid, and then rise up and supply the journals with it. These lubricator-holding boxes are suspended to the journals, and secured there tight and close, by running in Babbit or other metal *d*, in a groove which unites the reservoir and journals, and makes them perfectly tight against leakage or wastage, as well as against dust and grit.

*e* is the "brass," or bearers on top of the journals, and by which, through the pillar-blocks M M, the weight of the car and its load is carried to the journals of the axles, and thence to the wheels.

Instead of the plate-carrier *b*, for carrying up the oil, or other lubricating-material to the journals of the axles K, I may use a revolving brush, *f*, geared to the journal, so as to be turned by it, that will accomplish the same general purpose of dipping into the lubricating-material and carrying it up to the journals.

As an additional means of giving an alarm in case an axle or axles should break, and the body of the car drop by such breakage, I arrange a pulley-shaft, N, to which one end of a cord, or chain, $g$, is fastened, the other end thereof being fastened to a cord, or line, $h$, which may extend through the train to a bell, O, or to its striker P on the locomotive, or anywhere where the conductor of the train may have his place, or position, or to the brakeman's stand. This pulley-shaft is arranged over any one or all of the wheels, as may be desired, and so that should the car-body drop, by any accidental breakage, the said shaft would drop upon the perimeter of the wheel over which it was placed, and the friction and motion of the car-wheel would revolve this shaft N, wind up its cord or chain $g$, and thus suddenly jerk the bell-cord $h$, and sound an alarm.

The bell-cord would, of course, be broken by this arrangement of mechanism, but this would be comparatively trifling, in view of an alarm being given, so as to check and stop the train in time to avoid more serious accident.

At or near the centre of each truck there are suspended to the pairs of longitudinal pieces B B and C C, by straps $i\ i$, bearing-plates $j\ j$, upon the upper side of which are cogged racks $m$, in which work or roll the toothed or cogged rollers $n\ n$.

The object of making cogs upon the surfaces of the plate and of the rollers, is that they may retain their proper relative positions, whilst the latter act as friction-rolls.

There are also upon the bearing-plates, shoulders $o\ o'$, which serve as gauges for the movement of the bolster-beam Q, which rests and moves on these bearing-plates $j\ j$.

The bolster-beam has, upon its under side, plates $r\ r$, which have cogged racks $s\ s$ also upon them, for receiving the cogs of the rollers $n\ n$, and a shoulder, $t$, on each plate, to act in connection with the shoulders $o'$, on the under bearing-plate $j$, to define the extent of lateral shifting motion of the movable wheels of the truck when changed from one gauge to another.

From the ends of the bolster-beam Q project downward plates $p\ p$, through which a screw-shaft, $q$, furnished with threads near its ends, and which threads run in contrary directions, so as to make what is termed a right and left-hand screw, passes from side to side of the truck.

On each of the threads of this screw-shaft there is a travelling nut, $u$, interposed between the under bearing-plate $j$, and the plate $r$ on the bolster-beam, which nuts are so set, by turning the screw-shaft $q$, as that they may come up to and hold against the shoulders $o\ o$ on the plates $j\ j$.

The screw-shaft $q$ passes through the projections which form the shoulders $t$ on the plates $r\ r$, and on one end of said shaft there is a crank, O, by which it may be turned, to run the nuts toward or from the centre of said shaft, as may be required to properly set them.

If the truck or car is designed to be run or used on more than two different-gauged tracks, the screw-rod $q$, with its nuts, is indispensable. But when the truck or car is designed for two different gauges only, then the screw-rod and nuts can be dispensed with, but a shoulder, similar to that marked $t$, must be used, which is rigidly fastened on the outer ends of the cogged plates $r\ r$, and at such required distance from the shoulders $t$, as the differences in the gauges shall demand, and such additional space besides as will admit of the stationary shoulders on the cog-plates $j$ that come between them.

The body E of the car is supported on the side-pieces B B and C C of the truck-frame, by means of rubber or other springs P P; and said body is further supported on the bolster-beam Q by a steel spring, R, from which a king-bolt, $v$, passes upward through the block S, cup, or bearer $w$, and floor-timbers T U of the car-body.

In the cup $w$, which is divided horizontally, one portion being upon the block S, and the other portion on the beam T, there is placed a series of conical cogged rollers, $x$, which run or work in a cogged disk or plate in each portion of the cup, the object being to avoid friction, and to keep the friction-rolls in proper and regulated positions in relation to each other, and to the weight they are to relieve.

On the bolster-beam Q there are shoulders $y\ y$, against which the longitudinal pieces B B and C C take, and which define the lateral movement of said beam, for when the shifting-wheels are altered, they being on one side only of the car or truck, it is obvious that the beam must shift, so as to keep the body of the car and the weight centrally disposed between the wheels, whichever gauge they may be set for.

The side guard-boards H may be in sections of such length as to be conveniently handled, and hung or fitted to the train of cars throughout its length, so that they may serve as a shield to prevent persons or things from being thrown in upon the track, or under the wheels. At the same time they act to prevent the dust from rising from underneath the train.

Figure 4:
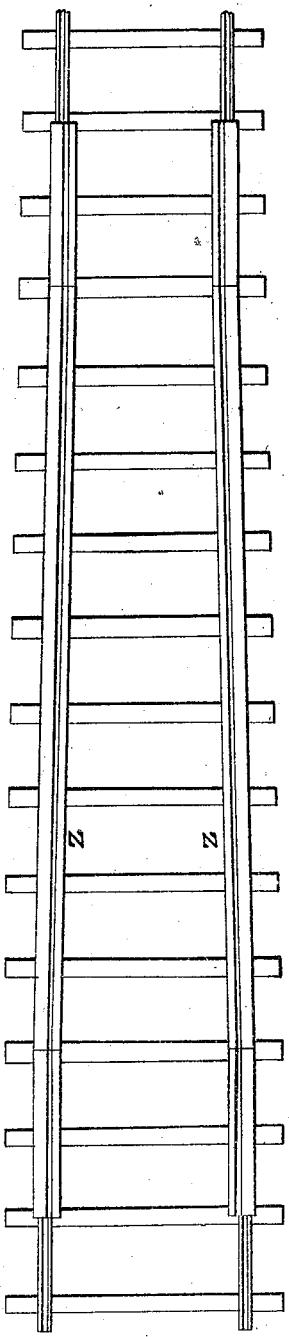
Figure 4 represents a section of railroad-track, in which the gauge is changed, to illustrate the operation of my improved car.

When the wider and narrower-gauged tracks meet, or are to unite, a gradually-contracting track is laid, as shown in fig. 4, and a guard-rail, $z$, is laid in connection with each track-rail, for the flanges of the wheels to run against, so that when the truck or car is prepared for the change of its gauge, which is done by backing out the keys or wedges J, it may be run from one main track to the other, over the graduated track between, or that unites them, and the impact of the flanges against the guard or guide-rails $z$, or the main rails, or both, shall of itself shift the movable wheels, so as to conform to either track or gauge.

Figure 2:
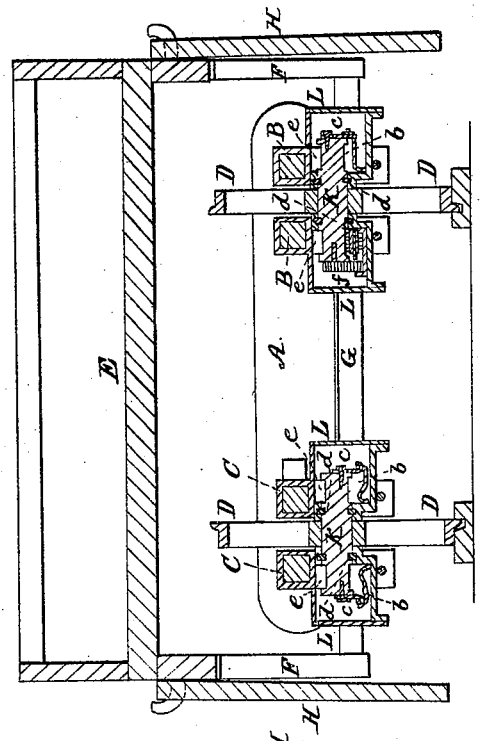
Figure 2 represents a vertical transverse section through the truck or car, in the plane of the journals of the wheels.
Figure 3:
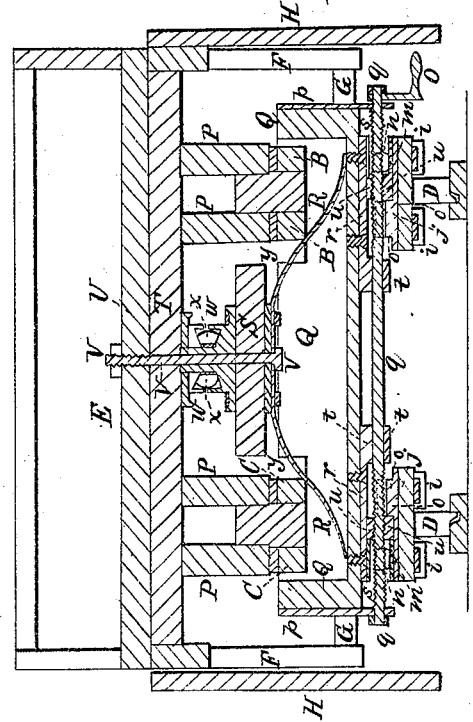
Figure 3 represents a similar section through the bolster and shifting-devices.

When the wheels are set for the wider-gauged track, then the parts are in the position shown in figs. 2, 3, and when in this position, and the keys or wedges J are inserted to hold the shifting-pieces C C, the cars will maintain that condition and gauge. When the cars are to be run from the wide to the narrow gauge, then the keys or wedges are drawn out, and the cars are pushed or drawn along the gradually-narrowing track, the guide or guard-rail $z$, or the groove formed by it, forcing in the movable wheels until the narrow gauge is reached; then the keys are set on or in the other side of the mortise, to hold the wheels to that gauge, it being understood, of course, that the mortises are so made as to admit of any and all such changes of gauge as may occur in the various intersecting roads. And when, as herein shown, the wheels are shifted, the shoulders $o'\ t$ will be brought up against each other, the shoulder $y$ of the bolster will come up against the inside longitudinal piece B, and the car is set to run on the narrow gauge.

By this mode of construction, I carry no unnecessary weight of car, and, indeed, considering that I dispense with through axles, I diminish the ordinary weight of a common narrow-gauge car.

I have described but one pulley-shaft, N, as connected to the car-body, whilst there should be two, as shown. The safety-cord, however, need only be connected to one, whilst the other is so arranged as to prevent the wheel from escaping on that side.

Having thus fully described my invention, and shown how it operates,

What I claim therein as new, and desire to secure by Letters Patent, is—

1. Arranging the wheels upon one side of a truck-frame in movable bars C C, whilst those on the other side are arranged in stationary bars B B, and mounting said wheels on their own independent axles, so that the movable ones may be shifted to or from the stationary ones, to adapt the car to roads of wider or narrower gauges, substantially as described.

2. Also, in combination with shifting-wheels on one side of a car or truck, a shifting bolster-beam, that brings the weight or the car-body into a position central between the wheels, whatever gauge said wheels may be set for, substantially as described.

3. Also, the combination of the screw-shaft $q$ and nuts $u\ u$, with the cogged or racked plates $j\ r$, and cogged rollers $n\ n$, as and for the purpose described and represented.

4. Also, in combination with a car-body and a bolster-beam, the cup $w$, with the circular racks and cogged rolls $x$, for allowing the trucks to freely turn under the body, or the body on the trucks, substantially as described.

5. Also, securing the oil or lubricating-boxes to their respective journals, by means of the recesses in said boxes and journals, and a "Babbit-metal" joint, substantially as described and represented.

6. Also, in combination with the truck-frame and car-body, the safety-beams G, suspended to the former, and so as to catch and hold the latter in case of breakage of the axles or wheels, substantially as described.

7. Also, the pulley-cylinders N, arranged above one or more of the wheels of the truck, with a cord connecting one of them with an alarm, so that if the body of the car, by any casualty, should drop, said pulley-cylinder would come in contact with the wheel and be rotated thereby, and, by winding up the cord, sound an alarm, substantially as described.

WM. M. SMITH.

Witnesses:
A. B. STOUGHTON,
EDMUND MASSON.